United States Patent
Chang et al.

(10) Patent No.: US 8,291,800 B2
(45) Date of Patent: Oct. 23, 2012

(54) COMBINATION POWER TOOL

(75) Inventors: Yen-Chih Chang, Taichung (TW);
Cheng-Hung Chiu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 1149 days.

(21) Appl. No.: 12/010,241

(22) Filed: Jan. 23, 2008

(65) Prior Publication Data

US 2008/0210072 A1 Sep. 4, 2008

(30) Foreign Application Priority Data

Jan. 25, 2007 (TW) .............................. 96102781 A

(51) Int. Cl.
*B26B 25/00* (2006.01)
*B26D 5/08* (2006.01)
*B26D 7/22* (2006.01)
*B26D 7/26* (2006.01)
*H02J 3/00* (2006.01)

(52) U.S. Cl. ..................... 83/471.2; 83/471.3; 83/486.1; 83/490; 83/574; 30/388; 200/50.01; 200/50.28; 200/61.71; 307/115; 310/50

(58) Field of Classification Search ............... 83/471.3, 83/486.1, 490, 574, 581, 471.2, 485, 486; 307/50.01, 50.09, 50.28, 51 R, 51.11, 61.62, 307/61.71–61.75, 333, 334, 115, 326–328; 310/50

See application file for complete search history.

(56) References Cited

U.S. PATENT DOCUMENTS

| 3,525,912 | A | * | 8/1970 | Wallin | 318/17 |
| 3,759,020 | A | * | 9/1973 | Simmons | 56/17.5 |
| 3,932,015 | A | * | 1/1976 | Ware et al. | 439/11 |
| 4,079,648 | A | | 3/1978 | Chappell | |
| 4,104,795 | A | * | 8/1978 | Lopic | 30/277.4 |
| 4,109,901 | A | | 8/1978 | Akin | |
| 4,328,728 | A | | 5/1982 | Ferdinand et al. | |
| 4,465,114 | A | | 8/1984 | Schumacher | |
| 4,494,431 | A | | 1/1985 | Niswonger | |
| 4,587,875 | A | | 5/1986 | Deley | |

(Continued)

FOREIGN PATENT DOCUMENTS

CN 1714973 A 1/2006

(Continued)

OTHER PUBLICATIONS

Chinese Office Action issued in CN 200710084022.0, Apr. 22, 2010.

*Primary Examiner* — Clark F. Dexter
(74) *Attorney, Agent, or Firm* — Bacon & Thomas, PLLC

(57) ABSTRACT

A combination power tool with a machine base, an independently operable portable circular saw, and a connection device for fastening the portable circular saw to the machine base to form a miter saw. The portable circular saw has a power supply unit including a first power socket that is provided at the front side of the portable circular saw and selectively electrically connectable to the motor of the portable circular saw, a second power socket provided at the rear side of the portable circular saw and selectively electrically connectable to the motor of the portable circular saw, and a power cable for connecting an external power source to one of the first power socket and the second power socket.

7 Claims, 6 Drawing Sheets

U.S. PATENT DOCUMENTS

| | | | |
|---|---|---|---|
| 4,648,301 A | 3/1987 | Scott | |
| 5,179,886 A | 1/1993 | Rathje, Jr. | |
| 6,049,142 A * | 4/2000 | Wakefield | 307/75 |
| 6,349,712 B1 * | 2/2002 | Halstead | 125/12 |
| 6,683,396 B2 * | 1/2004 | Toyama et al. | 310/50 |
| 7,526,833 B2 * | 5/2009 | Cochran et al. | 15/327.2 |
| 7,653,963 B2 * | 2/2010 | Cochran et al. | 15/323 |
| 2002/0096166 A1 * | 7/2002 | Halstead | 125/12 |
| 2003/0127932 A1 * | 7/2003 | Ishida et al. | 310/184 |

FOREIGN PATENT DOCUMENTS

CN      2803588 Y      8/2006

* cited by examiner

COMBINATION POWER TOOL

BACKGROUND

1. Field of the Invention

The present invention relates to a power tool and more particularly, to a combination power tool that can be used as a portable circular saw or a miter saw.

2. Description of the Related Art

Portable circular saws and miter saws are two different kinds of wood cutting tools. Normally, a portable circular saw is used for cross-sectionally cutting a wooden workpiece having longitudinally extending wood grains, or longitudinally cutting a wooden workpiece having transversely extending wood grains. A miter saw is practical for crosscutting a wooden workpiece as well as for cutting a wooden workpiece obliquely relative to the extending direction of the wood grains.

The aforesaid two different kinds of wood cutting tools are different in shape, however they both commonly use a motor to rotate a circular saw blade for cutting the workpiece and are similar in a particular cutting function. To achieve all the aforesaid various different cutting methods, a user, more particularly a DIY (do-it-yourself) user must obtain the aforesaid wood cutting tools. Such purchase of the aforesaid wood cutting tools can be cost prohibitive, especially for a DIY user.

SUMMARY

The present disclosure has been accomplished in view of the above discussed circumstances. Thus, a combination power tool that overcomes the technical problems of the aforesaid prior art sawing machines is provided.

To achieve this and other objects of the present disclosure, the combination power tool comprises a machine base, a portable circular saw, and a connection device for fastening the portable circular saw to the machine base. The machine base comprises a worktable that provides a work surface for supporting a workpiece for cutting, and a support arm that has a first end part connected to the worktable and a second end part biasable toward the work surface. The portable circular saw comprises a motor, a circular saw blade rotated by the motor to cut the workpiece carried on the worktable, a handle unit configured for holding by the user to operate the portable circular saw, a saw blade guard disposed around the circular saw blade to guard a part of the circular saw blade, and a power supply unit. The power supply unit comprises a power cable, a first power socket and a second power socket. The power cable has a first end connectable to an external power source and a second end selectively connectable to one of the first power socket and the second power socket. The first power socket is provided at a first side of the portable circular saw and selectively electrically connectable to the motor. The second power socket is provided at a second side of the portable circular saw and selectively electrically connectable to the motor. The connection device is adapted for detachably fastening the portable circular saw to the second end part of the support arm.

After connection of the portable circular saw to the second end part of the support arm of the machine base, the combination power tool works as a miter saw. When the portable circular saw is disconnected from the machine base, it is independently usable. Therefore, the combination power tool can be used for two different purposes. Further, the first power socket and the second power socket are respectively provided at the front and rear sides of the portable circular saw. When the combination power tool is used as a miter saw, the power cable connects the second power socket to the external power supply. When the portable circular saw is used independently, the power cable connects the first power socket to the external power supply. Therefore, the user can selectively connect the power cable to the first power socket or the second power socket depending upon the use of the portable circular saw, in order to prevent interference of the power cable with the user's cutting operation.

DETAILED DESCRIPTION OF THE EMBODIMENTS

Figure 1:
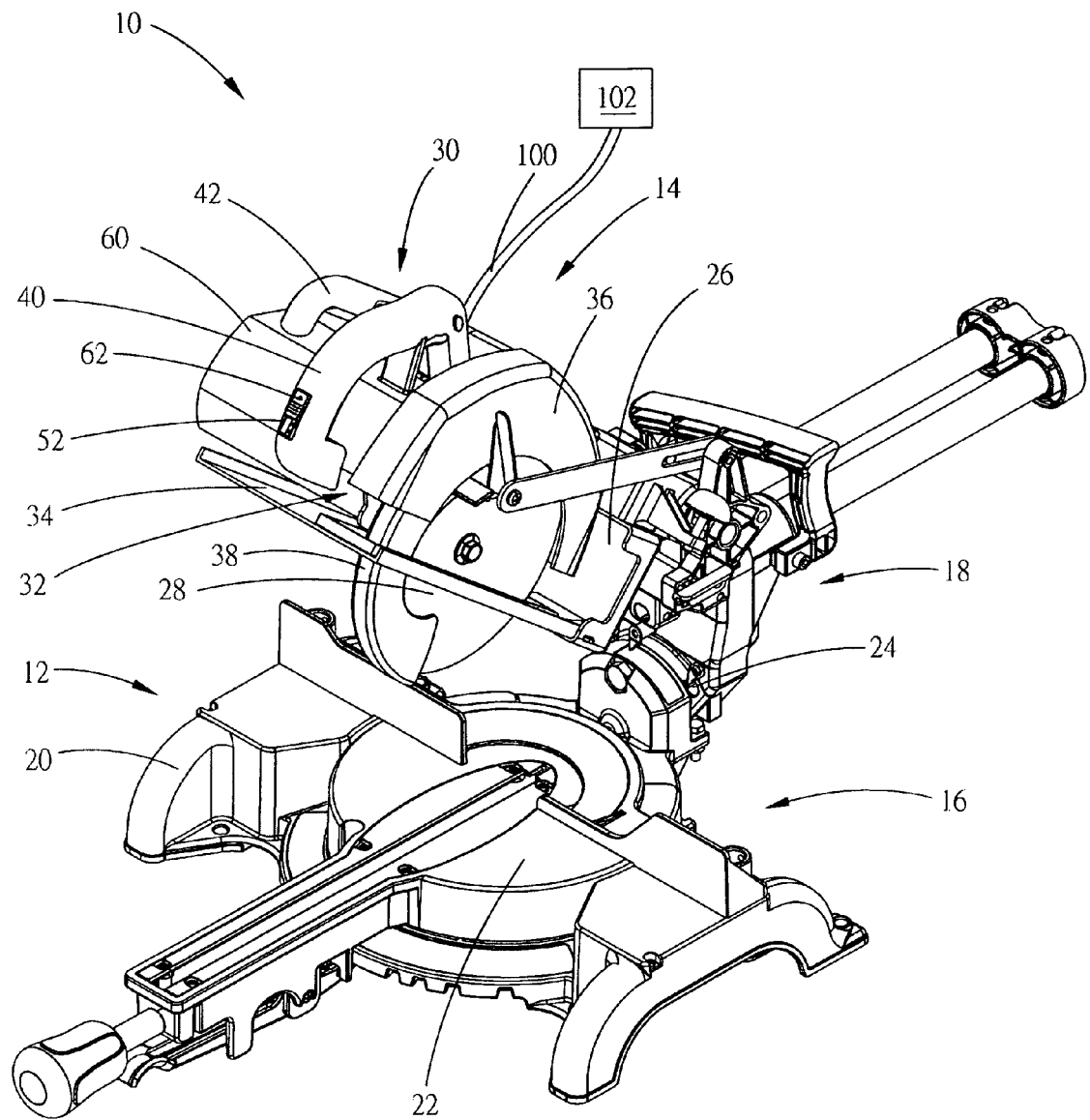
FIG. 1 is a front perspective view of a combination power tool according to the present disclosure.
Figure 2:
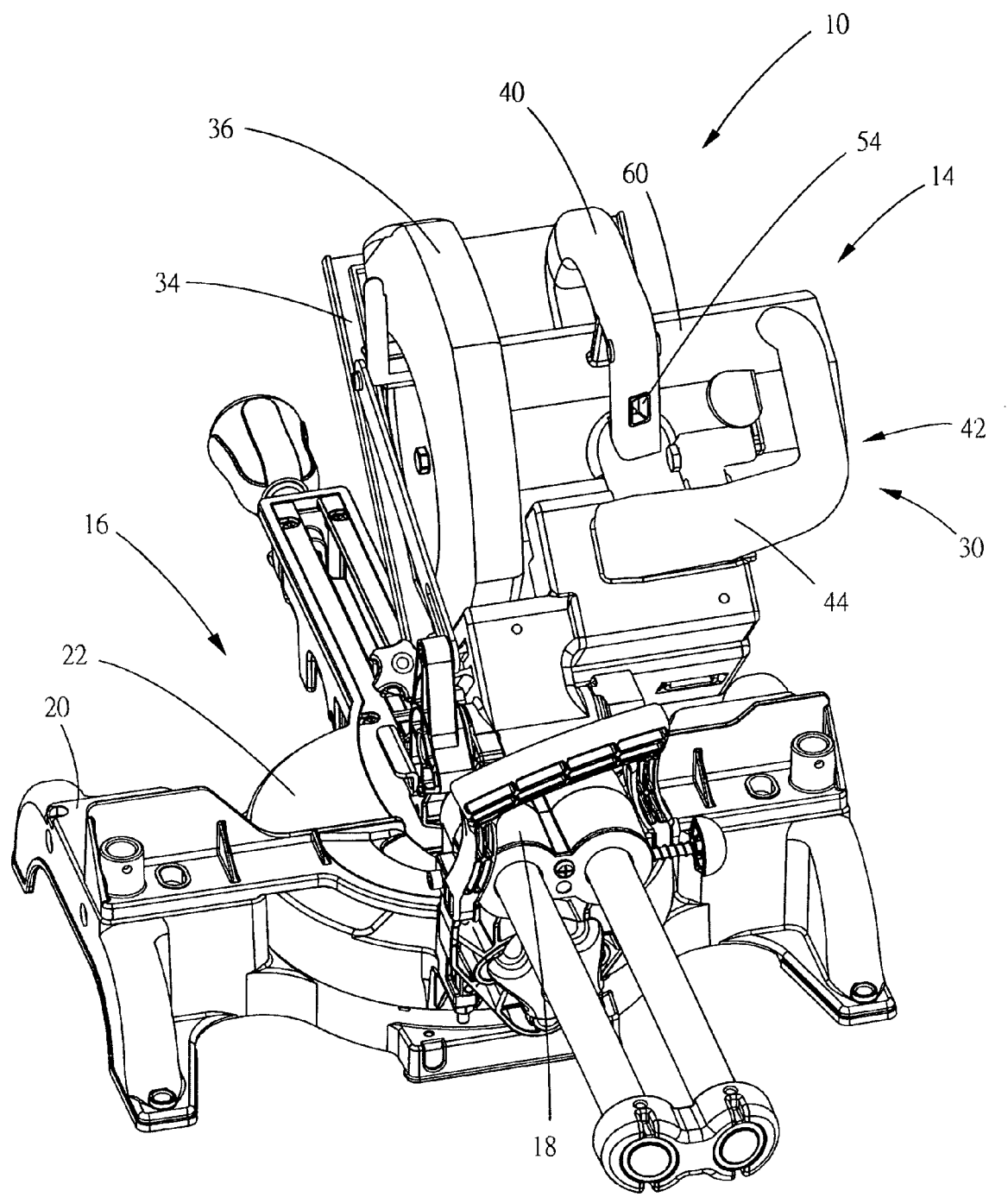
FIG. 2 is a rear perspective view of the combination power tool according to the present disclosure.

Referring to FIGS. 1 and 2, a combination power tool 10 in accordance with an exemplary embodiment is shown comprising a machine base 12, and a portable circular saw 14. The portable circular saw 14 can be used independently, or can be attached to the machine base 12 to form a miter saw. The machine base 12 comprises a worktable 16 and a support arm 18. The structure of the worktable 16 is similar to an ordinary miter saw, comprising a base block 20 and a rotary table 22. The rotary table 22 is rotatable relative to the base block 20 to adjust the cutting angle of the combination power tool 10. The base block 20 and the rotary table 22 constitute a work surface at the top for carrying a workpiece (not shown) for cutting. The support arm 18 has a first end part 24 connected to the rotary table 22. The first end part 24 can be affixed or hinged to the rotary table 22. Similar to an ordinary miter saw, the second end part 26 of the support arm 18 is suspended above the rotary table 22 and is biasable inwards and outwards relative to the work surface for the detachable connection of the portable circular saw 14 thereto.

The portable circular saw 14 is detachably fastened to the second end part 26 of the support arm 18, and comprises a motor 60, a circular saw blade 28, a handle unit 30, a saw blade guard 32, a power supply unit, and a shoe 34. The motor 60 is operable to rotate the circular saw blade 28 for cutting the workpiece. The saw blade guard 32 is disposed adjacent to the circular saw blade 28 to shield the circular saw blade 28, and comprises a fixed guard member 36 and a movable guard member 38 movable in and out of the fixed guard member 36 around the periphery of the circular saw blade 28. The handle unit 30 includes a front handle 40 and a rear handle 42 for holding by the user to operate the portable circular saw 14. The front handle 40 is disposed at the front side facing the user. The longitudinal direction of the front handle 40 is substantially in parallel to the circular saw blade 28. The rear handle 42 is disposed at the rear side, and has a grip 44 that extends in direction substantially perpendicular to the circular saw blade 28. The shoe 34 is arranged around the circular saw blade 28. After disconnection of the portable circular saw 14 from the second end part 26 of the support arm 18 for use independently to cut a workpiece (not shown), the shoe 34 is supported on the surface of the workpiece, facilitating the cutting process. The height of the circular saw blade 28 below the shoe 34 is equal to the cutting depth of the portable circular saw 14. The interconnection of the aforesaid parts is similar to a conventional portable circular saw, and therefore no further detailed description in this regard is necessary.

Figure 3:
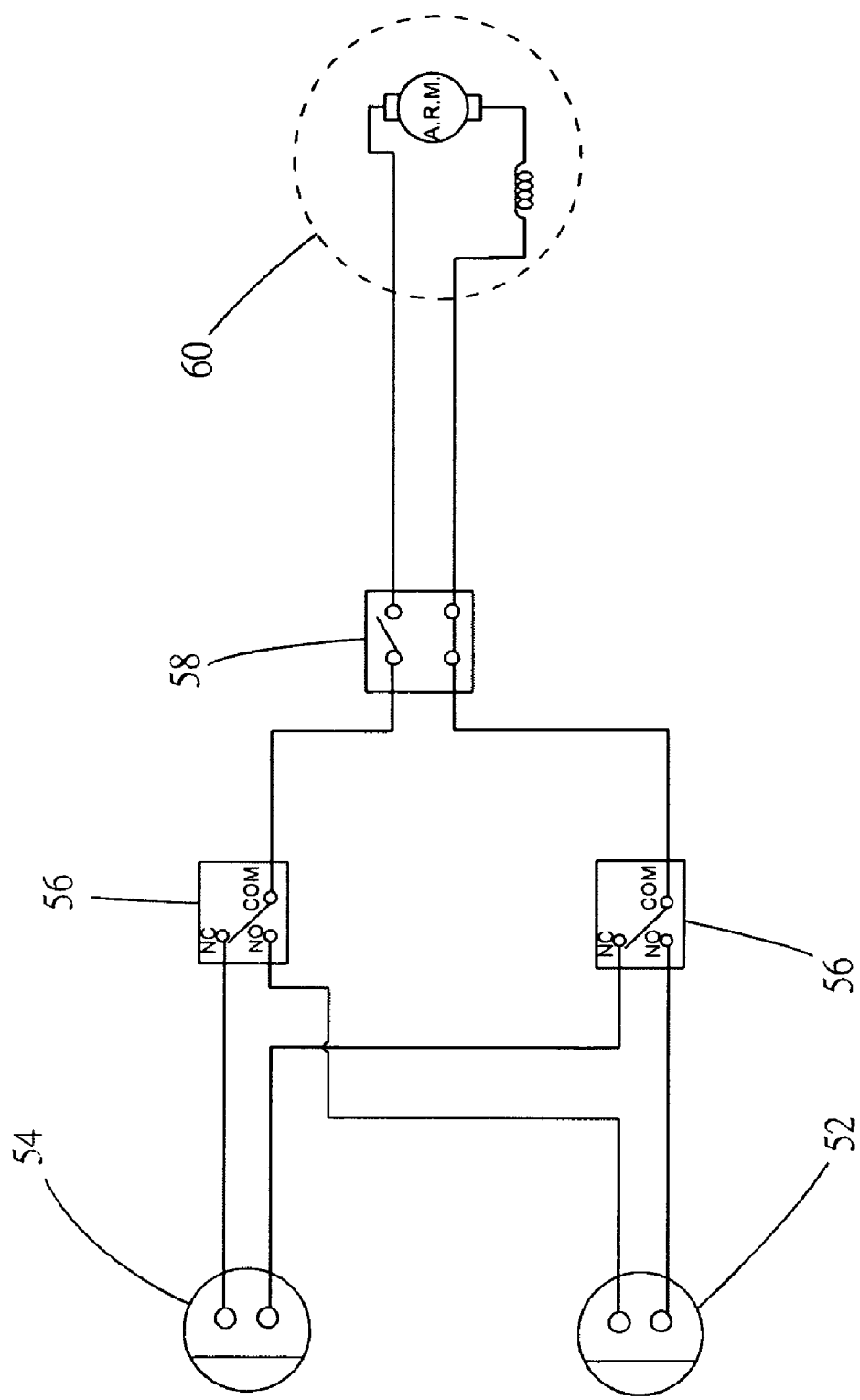
FIG. 3 is a schematic circuit block diagram of the power supply unit of the combination power tool according to the present disclosure.

FIG. 3 is a schematic circuit block diagram of the power supply unit of the combination power tool according to the present embodiment. As illustrated, the power supply unit comprises a power cable 100, a first power socket 52, a second power socket 54, two limit switches 56, and a start switch 58. As shown in FIGS. 1 and 2, the first power socket 52 is disposed at the front side of the portable circular saw 14, for example, at the front side of the front handle 40, for selectively connecting the power cable 100 with the motor 60. The second power socket 54 is disposed at the rear side of the portable circular saw 14, for example, at the rear end of the front handle 40, for selectively connecting the power cable 100 with the motor 60. The power cable 100 has its one end connected to an external power source 102 and its other end selectively connected to the first power socket 52 or the second power socket 54. When the portable circular saw 14 is connected to the machine base 12 for enabling the combination power tool 10 to be used as a miter saw, the power cable 100 is connected to the second power socket 54. When the portable circular saw 14 is disconnected from the machine base 12 for use independently, the power cable 100 is connected to the first power socket 52. For the purpose of safety, the position of the power cable should not interfere with the user's operation. Therefore, the two power sockets are positioned at different locations for the selective connection of the power cable depending upon the operation mode of the combination power tool, so that the power cable does not interfere with the user's cutting operation when the portable circular saw 14 is used independently or attached to the machine base 12 to work with the machine base 12 as a miter saw.

Referring again to FIG. 3, each limit switch 56 has a common contact COM, a first pole contact NO, and a second pole contact NC. The two first pole contacts NO are in a normally open position and are respectively electrically connected to the two poles (positive and negative terminals) of the first power socket 52. The two second pole contacts NC are in a normally closed position and are respectively electrically connected to the two poles (positive and negative terminals) of the second power socket 54. The two common contacts COM are respectively electrically connected to the two poles (positive and negative terminals) of the start switch 58. The start switch 58 is electrically connected to the motor 60 for switching on/off the motor 60.

Referring again to FIGS. 1 and 3, the power supply unit further comprises a sliding cover 62 provided at the front side of the portable circular saw 14 and slidably coupled to the front side of the front handle 40. The sliding cover 62 has a bottom end disposed outside the front handle 40, and a top end (not shown) disposed inside the front handle 40. When the sliding cover 62 is in a covering position and is not slidably operated, the bottom end covers the first power socket 52, and at this time, the two limit switches 56 are in a normally open position, i.e., the first pole contact NO of each limit switch 56 is in the normally open position and the second pole contact NC of each limit switch 56 is in the normally closed position. At this time, the first power socket 52 is electrically disconnected from the second power socket 54 and the motor 60. Therefore, when the power cable 100 has its one end connected to an external power source and its other end connected to the second power socket 54, the first power socket 52 is in the off state, and accidentally touching the first power socket 52 does not cause an electric shock. When the sliding cover 62 is moved upwardly away from the first power socket 52 to an uncovering position, the top end of the sliding cover 62 pushes the switching lever (not shown) of each limit switch 56, reversing each normal open to normal closed and each normal closed to normal open, and therefore, the second power socket 54 is electrically disconnected from the first power socket 52 and the motor 60. Therefore, no accidental electric shock will happen in either of the following two conditions:

1. When the user moves the sliding cover 62 and touches the first power socket 52 accidentally after connection of two opposite ends of the power cable 100 to an external power source and the second power socket 54; and 2. When the user moves the sliding cover 62 and touches the second power socket 54 after connection of two opposite ends of the power cable 100 to an external power source and the first power socket 52.

Figure 4:
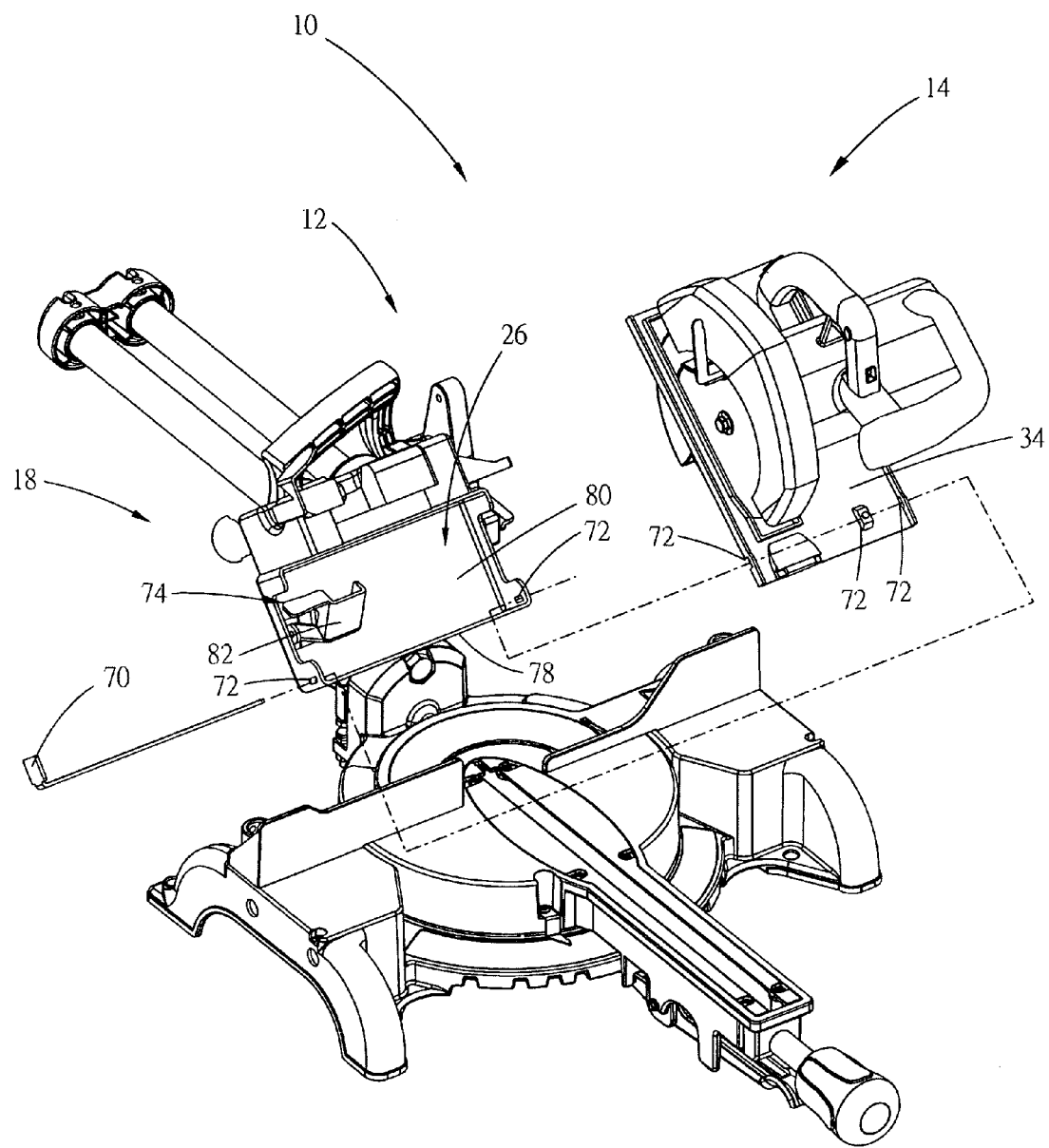
FIG. 4 is a schematic drawing showing the connection arrangement between the portable circular saw and the machine base of the combination power tool.

FIG. 4 is a schematic drawing showing the connection arrangement between the portable circular saw 14 and the machine base 12 of the combination power tool 10. The combination power tool 10 further comprises a connection device for detachably connecting the portable circular saw 14 to the second end part 26 of the support arm 18. According to this embodiment, the connection device comprises a pin 70, a plurality of through holes 72, and a hold down device 74. The second end part 26 of the support arm 18 has a forwardly extending extension board 78, and a bottom surface 80 disposed in a substantially perpendicular manner relative to the extension board 78. The through holes 72 are respectively provided at the rear side of the shoe 34 and the extension board 78. When the rear side of the shoe 34 is attached to the extension board 78, the through holes 72 are aligned in a line, and the pin 70 is inserted through the through holes 72 and retains the rear side of the shoe 34 to secure the shoe 34 to the second end part 26 of the support arm 18. The hold down device 74 has its one end pivotally connected to the bottom surface 80 of the second end part 26, and its other end defining a hold down surface 82. The hold down device 74 can be biased downwards to force the hold down surface 82 against the pin 70, thereby locking the shoe 34 to the second end part 26 of the support arm 18. In an alternate form of the present embodiment (not shown), the second end part of the support arm has only the bottom surface without the extension board; the shoe has an upwardly extending plane board; the through holes are respectively provided at the plane board and the bottom side of the second end part; the hold down device is pivotally connected to the shoe; the pin is inserted through the through holes on the plane board and the bottom side of the second end part after attachment of the plane board to the bottom side of the second end part and held down in position by the hold down device.

Figure 5:
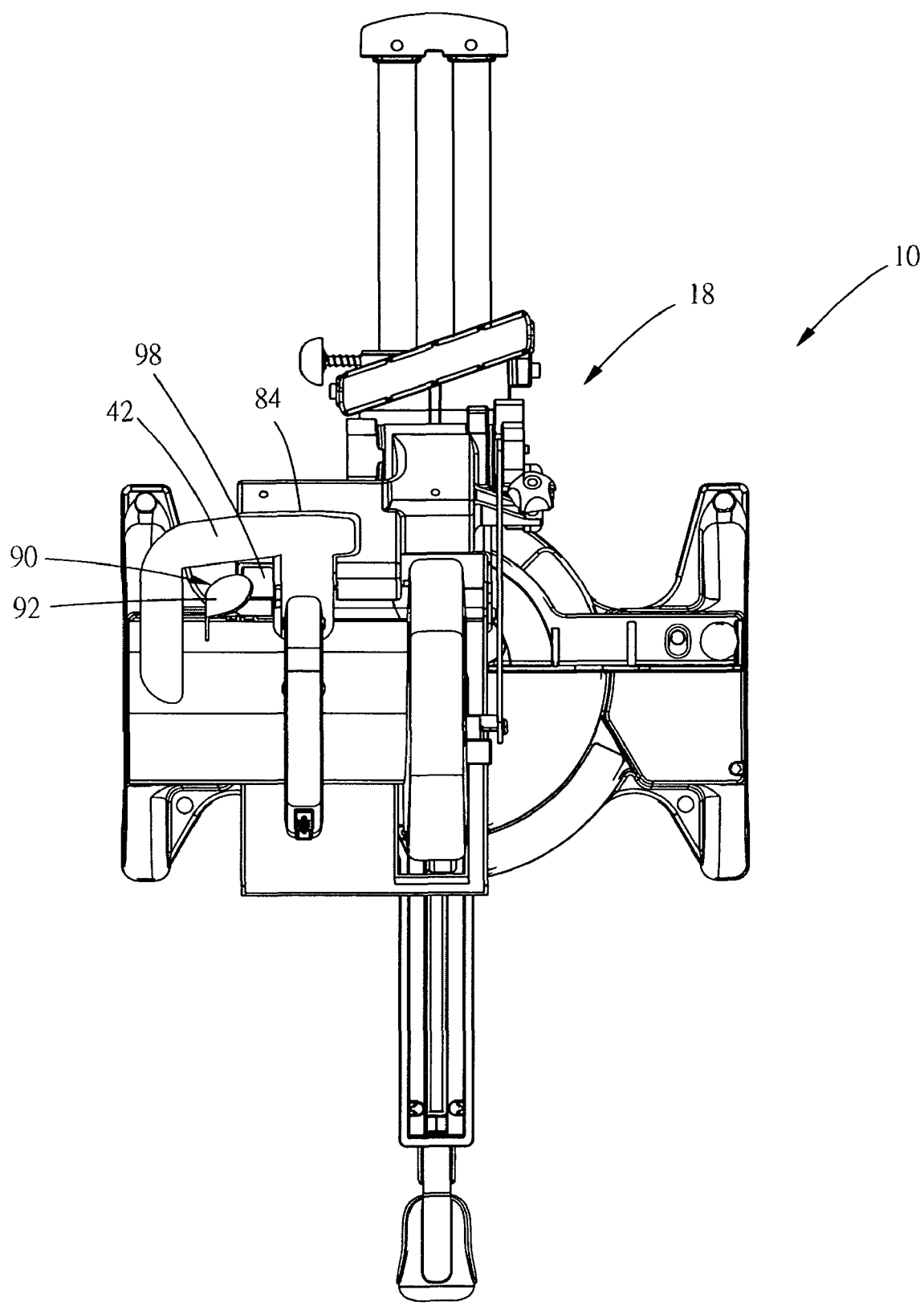
FIG. 5 is a top view of the combination power tool according to the present disclosure.
Figure 6:
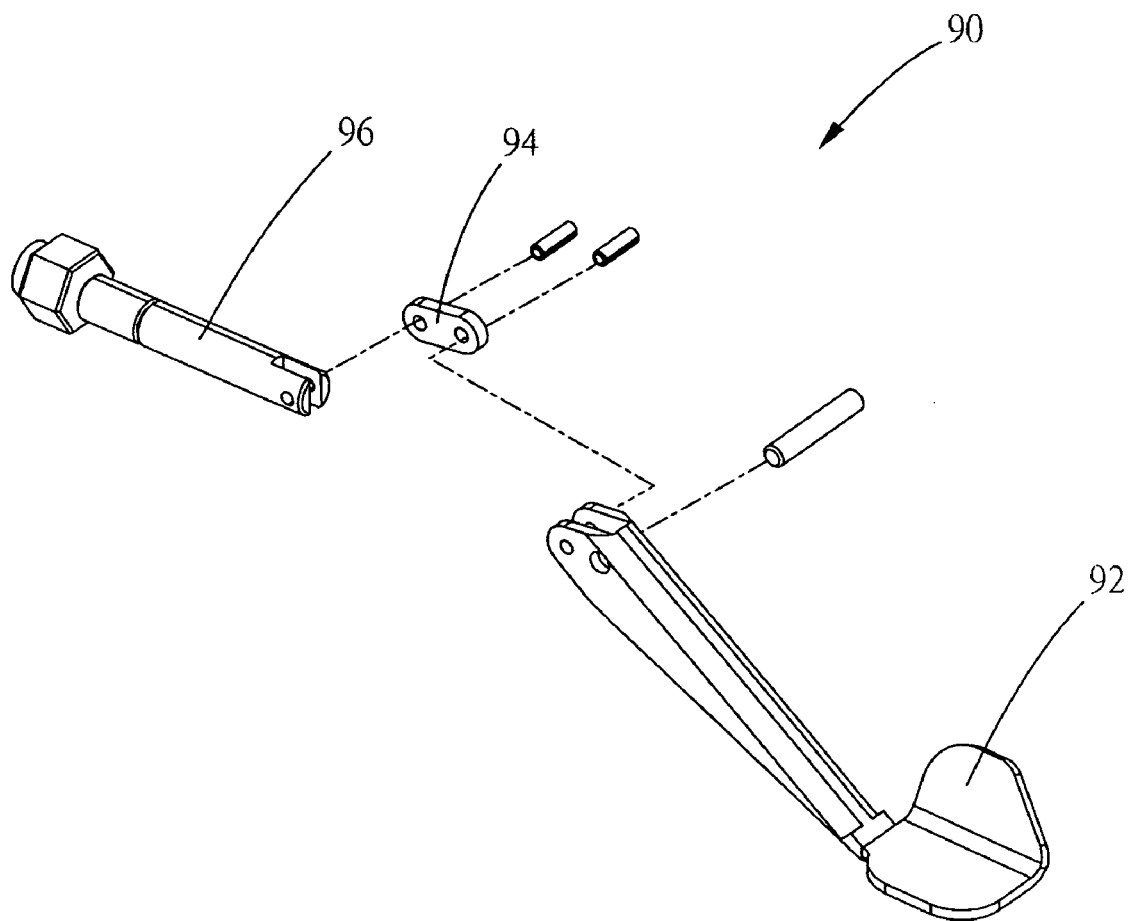
FIG. 6 is an exploded view of the clamp of the combination power tool according to the present disclosure.

Referring to FIGS. 5 and 6, the second end part 26 of the support arm 18 has a T-groove 84 on the top side that fits the contour of one end of the rear handle 42 that is disposed near the circular saw blade 28. The aforesaid connection device further comprises a clamp 90. The clamp 90 is comprised of a lever 92, a link 94, and a push rod 96. The push rod 96 is inserted into a lateral part 98 at one side of the T-groove 84 and is movable forwards and backwards. The link 94 has one end pivotally connected to one end of the push rod 96, and the other end pivotally connected to one end of the lever 92. The lever 92 is also pivotally connected to the lateral part 98 at a location between the other end of the lever 92 and the pivot point between the link 94 and the lever 92 and relatively closer to the pivot point between the link 94 and the lever 92. After insertion of the T-shaped end of the rear handle 42 into the T-groove 84, the user can operate the lever 92 to move the push rod 96 forwards, forcing the push rod 96 to hold down the T-shaped end of the rear handle 42 in the T-groove 84.

As stated above, the power supply unit of the combination power tool 10 has the first power socket 52 provided at the front side of the portable circular saw 14 and the second power socket 54 provided at the rear side of the portable circular saw 14. Therefore, the user can selectively connect the power cable 100 to the first power socket 52 or the second power socket 54 depending upon the desired use of the portable circular saw 14, in order to prevent interference of the power cable with the user's cutting operation. The power supply unit further uses the limit switches 56 to control the circuit connection status between the first power socket 52 and the second power socket 54. When one power socket 52 or 54 is electrically connected to the motor 60, the other power socket 54 or 52 is electrically disconnected from the power socket 52 or 54 and the motor 60, thus preventing an electric shock upon the touching of the idle power socket accidentally by the user. Further, the connection device of the combination power tool 10 detachably locks the rear side of the shoe 34 and the T-shaped end of the rear handle 42 of the portable circular saw 14 to the second end part 26 of the support arm 18, preventing accidental disconnection of the portable circular saw 14 from the second end part 26 of the support arm 18.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A combination power tool comprising:
    a machine base having:
        a worktable with a work surface configured for supporting a workpiece for cutting; and
        a support arm having a first end part connected to said worktable and a second end part remote from said first end part;
    a portable circular saw having:
        a motor;
        a circular saw blade rotated by said motor; and
        a power supply unit having a power cable, a first power socket and a second power socket, said power cable having a first end configured to be connectable to an external power source and a second end selectively connectable to one of said first power socket and said second power socket, said first power socket being provided at a first side of said portable circular saw and selectively electrically connectable to said motor, said second power socket being provided at a second side of said portable circular saw and selectively electrically connectable to said motor; and
    a connection device detachably fastening said portable circular saw to the second end part of said support arm.

2. The combination power tool according to claim 1, wherein said power supply unit further comprises at least one limit switch and a start switch electrically connected to said motor, said at least one limit switch each comprising a first pole contact, a second pole contact and a common contact, said first pole contact and said second pole contact respectively electrically connected to said first power socket and said second power socket, said common contact electrically connected to said start switch, wherein said at least one limit switch and said start switch provide said selective electrical contact of said power sockets to said motor.

3. The combination power tool according to claim 2, wherein said first pole contact is in a normal open status and electrically connected to said first power socket; said second pole contact is in a normal closed status and electrically connected to said second power socket; said power supply unit further comprises a sliding cover slidably provided at the first side of said portable circular saw and adapted for covering said first power socket, said sliding cover movable relative to the first side of said portable circular saw to an open position to open said first power socket, said sliding cover causing said at least one limit switch to change the normal open status of said first pole contact to a normal closed status and the normal closed status of said second pole contact to a normal open status when moved to said open position to open said first power socket.

4. The combination power tool according to claim 3, wherein the number of said at least one limit switch is two; the first pole contacts of the two limit switches are respectively electrically connected to positive and negative terminals of said first power socket; the second pole contacts of the two limit switches are respectively electrically connected to positive and negative terminals of said second power socket; the two common contacts of the two limit switches are respectively electrically connected to positive and negative terminals of said start switch.

5. A power supply unit of a power tool, comprising:
    a start switch;
    a first power socket selectively electrically connectable to said start switch;
    a second power socket selectively electrically connectable to said start switch;
    at least one limit switch for providing the selective electrical connection to said start switch, said at least one limit switch comprising a first pole contact, a second pole contact and a common contact, the first pole contact of said at least one limit switch respectively electrically connected to said first power socket, and the second pole contact of said at least one limit switch respectively electrically connected to said second power socket, the common contact of said at least one limit switch respectively electrically connected to said start switch; and
    a power cable having a first end configured to be connectable to an external power source and a second end selectively connectable to one of said first power socket and said second power socket.

6. The power supply unit according to claim 5, wherein said first pole contact is in a normal open status; said second pole contact is in a normal closed status; said power supply unit further comprises a sliding cover adapted for covering one of said power sockets, said sliding cover movable to an open position to open said covered power socket, said sliding cover causing said at least one limit switch to change the normal open status of said first pole contact to a normal closed status and the normal closed status of said second pole contact to a normal open status when moved to said open position to open said covered power socket.

7. The power supply unit according to claim 6, wherein the number of said at least one limit switch is two, each limit switch comprising the first pole contact, the second pole contact and the common contact; the first pole contacts of the two limit switches are respectively electrically connected to positive and negative terminals of said first power socket; the second pole contacts of the two limit switches are respectively electrically connected to positive and negative terminals of said second power socket; and the respective common contacts of the two limit switches are respectively electrically connected to positive and negative terminals of said start switch.

* * * * *